April 15, 1924.
A. R. HYATT
1,490,324
TIRE APPLYING AND REMOVING TOOL
Filed March 5, 1923
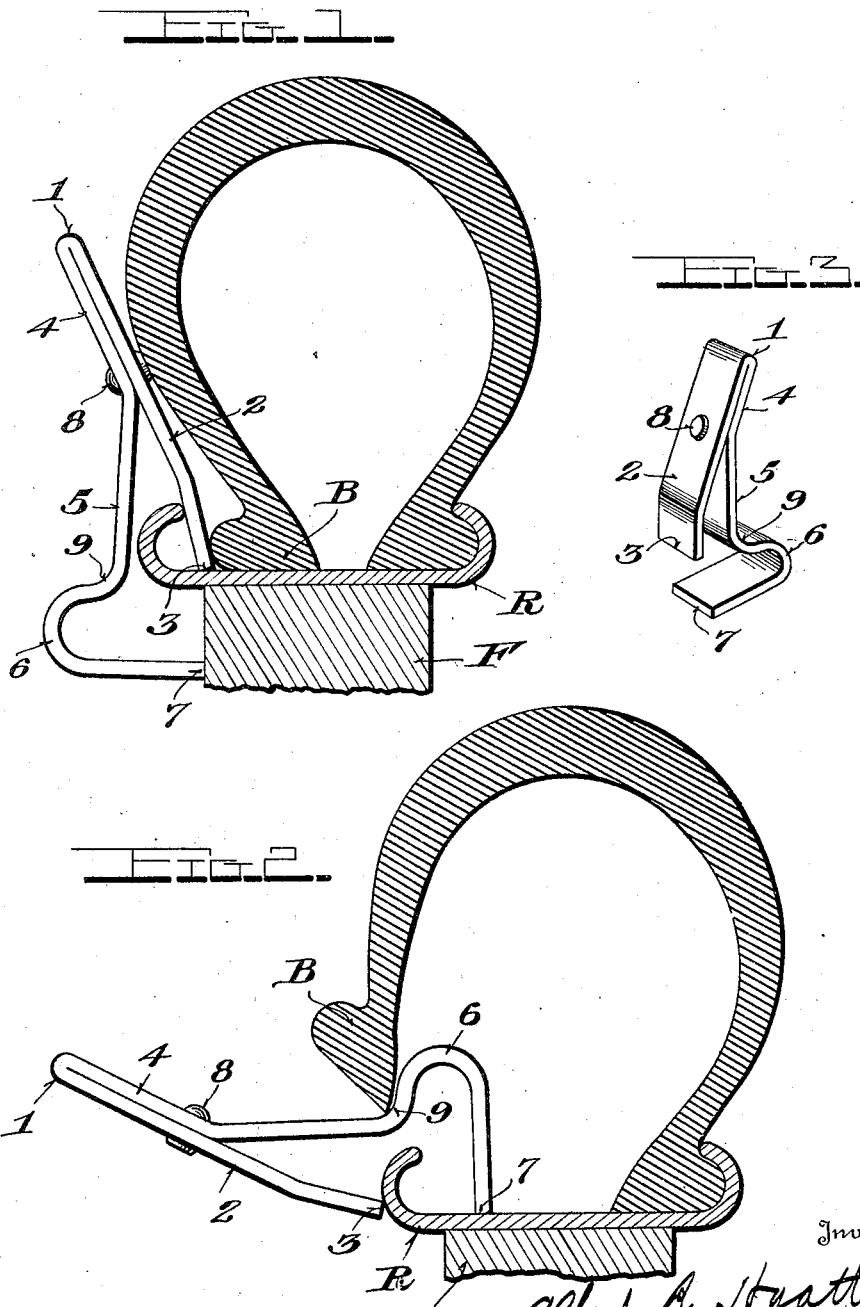

Patented Apr. 15, 1924.

1,490,324

UNITED STATES PATENT OFFICE.

ALBERT R. HYATT, OF BERESFORD, SOUTH DAKOTA.

TIRE APPLYING AND REMOVING TOOL.

Application filed March 5, 1923. Serial No. 622,889.

*To all whom it may concern:*

Be it known that I, ALBERT R. HYATT, a citizen of the United States, residing at Beresford, in the county of Union and State of South Dakota, have invented certain new and useful Improvements in Tire Applying and Removing Tools, of which the following is a specification.

This invention relates to certain new and useful improvements in tire applying and removing tools, and the primary object thereof, is to provide a tool of this type, which effects removal of the tire from the rim, and which also enables the tire to be applied to the rim in an easy and quick manner.

A further object of the invention is to provide a tire tool of this character, which is formed of a single or integral strip of material, and which can be easily and quickly bent or formed into its finished or completed state.

With the above and other objects in view, the invention resides in the combination and features of construction hereinafter described and claimed.

In the drawings:—

Figure 1, is a transverse section of an automobile tire and its rim showing the present invention applied in position ready to apply the tire.

Figure 2, is a like view, but showing the tool in the act of removing the tire, and Figure 3, is a detail perspective view of the tool.

In proceeding in accordance with the present invention, a piece of strap steel or strip metal of suitable size and strength is bent over or doubled upon itself as indicated at 1, in the drawings to form an arm 2 which conformably engages a side of the tire, the free end 3 of the arm fitting against the bead B of the tire. The opposite end portion of the stock forms an arm 4 which engages the adjacent part of arm 2 and is riveted to the latter as indicated at 8, the abutting parts of the arms 2 and 4 forming a handle for the tool which is of double thickness of the material. Arm 4 has an outwardly inclined part 5 which is curved at 6 and extended at 7 toward the arm 2, the parts 6 and 7 forming a jaw which in one position engages the bead B. In use, in applying a tire, one side of the latter is first positioned on the rim, as usual, whereupon the tool is applied to the opposite side of the tire and to the adjacent side of the rim as illustrated in Figure 1 and wherein end 3 of arm 2 engages the bead B and holds the latter on the rim by virtue of the free end of part 7 engaging the side of the wheel felloe F. The tire is thus held onto the rim at the point of application of the tool, leaving the operator free use of both hands in manipulating the usual tire irons to apply the remaining portion of the tire to the rim, whereupon the tool is removed.

Figure 2, illustrates the use of the tool in removing a tire, and wherein, the tool is applied to the tire and rim, by inserting end 7 between the flange of rim R and the bead B of the tire after the edge of the tire casing has been raised by use of the usual tool for this purpose, to cause the bead B to seat in the angle 9 between parts 5 and 6.

In applying the tire it will be noted that the tool is self supporting as depicted in Figure 1, of the drawings, the extension or base 7 of the jaw seating against the felloe side while the arm 2 seats against the rim flange R, the tire pressing against the arm 2 to hold the latter against the flange R and to hold part 7 against the felloe F.

What is claimed is:—

1. In a tire tool, a metal strip having a handle-forming portion formed of two thicknesses of the strip, one end of the strip being free and forming an arm for engaging between the rim flange and the adjacent bead of the tire, the opposite end portion of the strip having a part inclined relative to said arm and having an outwardly curved part and having its free end disposed at a substantially right angle to the inclined part and extending beyond the latter and terminating substantially in alinement with the free end of the arm, said parts being so related so that in one position of the tool the free end of the arm will engage the rim flange and the free end of the right angular part will seat on the rim and extend radially thereof, while the tire bead will be engaged in the angle between the inclined and curved parts.

2. In a tire tool, a body having a handle, an arm formed to engage between the rim flange and the adjacent bead of the tire, a part inclined relative to the arm and having an outwardly curved part and terminating in a part disposed at substantially right angles to the inclined part, said right-angular part being formed to seat on the rim and extend radially therefrom and the outwardly curved part being formed to extend within the tire and with the tire bead engaged in the angle between the arm and the convex side of the outwardly curved part.

In testimony whereof I affix my signature.

ALBERT R. HYATT.